(12) United States Patent
Greiner et al.

(10) Patent No.: US 12,389,832 B1
(45) Date of Patent: Aug. 19, 2025

(54) WRAP STRETCH SENSING FOR A BALER IMPLEMENT

(71) Applicant: DEERE & COMPANY, Moline, IL (US)

(72) Inventors: Luke J. Greiner, Keota, IA (US); Jeremy M. Erdmann, Floris, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/792,075

(22) Filed: Aug. 1, 2024

(51) Int. Cl.
  *A01F 15/07* (2006.01)
  *B65B 11/02* (2006.01)
  *B65B 27/12* (2006.01)
  *B65B 41/16* (2006.01)
  *B65B 57/12* (2006.01)

(52) U.S. Cl.
  CPC ........ *A01F 15/0715* (2013.01); *B65B 11/025* (2013.01); *B65B 27/12* (2013.01); *B65B 41/16* (2013.01); *B65B 57/12* (2013.01); *A01F 2015/072* (2013.01); *A01F 2015/076* (2013.01)

(58) Field of Classification Search
  CPC ............ A01F 15/0715; A01F 2015/076; A01F 2015/072; A01F 2015/0725; B65B 41/16; B65B 41/12; B65B 57/12
  See application file for complete search history.

(56) References Cited

U.S. PATENT DOCUMENTS

| 5,551,218 | A  | * | 9/1996 | Henderson | A01F 15/141 100/88 |
| 6,675,561 | B2 | * | 1/2004 | Davis | A01F 15/0833 100/7 |
| 7,337,713 | B1 | * | 3/2008 | Olander | B65B 27/125 100/88 |
| 7,409,814 | B2 | * | 8/2008 | Hood | A01F 15/0715 53/399 |
| 11,096,333 | B2 | * | 8/2021 | Biziorek | A01F 15/0715 |
| 11,096,334 | B2 | * | 8/2021 | Lebeau | B65B 57/04 |
| 11,991,957 | B2 | * | 5/2024 | Kappelman | A01F 15/0883 |
| 2003/0115841 | A1 | * | 6/2003 | Davis | A01F 15/0715 53/118 |
| 2006/0048481 | A1 | * | 3/2006 | Hood | A01F 15/0715 53/399 |
| 2020/0008358 | A1 | * | 1/2020 | Lebeau | B65B 27/125 |
| 2023/0081287 | A1 | * | 3/2023 | Kappelman | A01F 15/0883 53/203 |
| 2023/0371436 | A1 | * | 11/2023 | Derscheid | A01F 15/071 |
| 2025/0040488 | A1 | * | 2/2025 | Roberge | B65B 57/12 |

* cited by examiner

*Primary Examiner* — Andrew M Tecco

(57) ABSTRACT

A baler implement includes a baler controller configured to determine an unstretched length of wrap material dispensed by a wrap system during a wrap cycle, and determine a circumference of a bale in a baling chamber. The baler controller may then determine a stretched length of the wrap material as applied onto the bale during the wrap cycle from the circumference of the bale and a number of wrap layers of the wrap material wrapped around the circumference of the bale. The baler controller may then compare the stretched length of the wrap material as applied onto the bale to the unstretched length of the wrap material dispensed by the wrap system during the wrap cycle to determine an applied wrap stretch factor. The applied wrap stretch factor may be communicated to an operator, or used to control the wrap system to achieve a desired wrap stretch.

16 Claims, 4 Drawing Sheets

WRAP STRETCH SENSING FOR A BALER IMPLEMENT

TECHNICAL FIELD

The disclosure generally relates to a baler implement, and more particularly to a method of controlling a wrap system of the baler implement.

BACKGROUND

There are a wide variety of different types of baler implements that generate bales of material. Such baler implements can bale material like hay, straw, silage, cotton, recycled paper products, etc. One type of machine produces a bale having a cylindrical shape. Such a machine is often referred to as a round baler. A round baler gathers crop material and feeds the crop material into a baling chamber. The baler implement rolls the crop material in a spiral fashion into the bale having a cylindrical shape. Once formed, the baler implement wraps the bale with a wrap material to secure the cylindrical shape of the bale and hold the baled crop material together.

The wrap material may include, for example, a net wrap or a solid wrap. The wrap material must be tightly tensioned about the exterior circumferential surface of the completed bale to secure the shape of the bale and hold the baled crop material together. If the wrap material is not sufficiently tensioned, the bale will be loose, allowing the crop material to sag and/or deform from the desired cylindrical shape. When properly tensioned, the wrap material maintains the generally cylindrical shape of the bale without excessive sag and/or deformation of the desired cylindrical shape. When properly tensioned, the wrap material exhibits a desired amount of stretch, particularly in the circumferential direction, relative to an unstretched condition of the wrap material.

It is known to include markings on the wrap material for indicating an amount of stretch in the wrap material. For example, the wrap material may include a pair of lines spaced apart from each other a defined distance when in an upstretched condition. The spacing between the pair of lines may be measured on the completed bale in the as applied condition, and the amount of stretch estimated based on the change in the distance between the unstretched condition and the as-applied condition. This procedure requires the operator to stop the baling operation, exit the tractor, and examine the completed and ejected bale to determine the amount of stretch in the wrap material.

SUMMARY

A baler implement is provided. The baler implement includes a baling system having a baling chamber configured to form crop material into a bale having a cylindrical shape. A wrap system is configured to feed a wrap material into the baling chamber to wrap a circumference of the bale with a number of wrap layers of the wrap material during a wrap cycle. A wrap sensor is configured to detect data related to an unstretched length of the wrap material dispensed by the wrap system during the wrap cycle. A bale size sensor is configured to detect data related to a diameter of the bale within the baling chamber. The baler implement further includes a baler controller including a processor and a memory having a wrap stretch algorithm stored thereon. The processor is operable to execute the wrap stretch algorithm to determine the unstretched length of the wrap material dispensed by the wrap system during the wrap cycle from the data sensed by the wrap sensor related to the unstretched length of the wrap material. The baler controller further determines a circumference of the bale in the baling chamber from the data sensed by the bale size sensor related to the diameter of the bale. The baler controller may then determine a stretched length of the wrap material as applied onto the bale during the wrap cycle from the circumference of the bale in the baling chamber and the number of wrap layers of the wrap material, and then compare the stretched length of the wrap material as applied onto the bale to the unstretched length of the wrap material dispensed by the wrap system during the wrap cycle to determine an applied wrap stretch factor.

In one aspect of the disclosure, the applied wrap stretch factor may be defined in terms of a percentage of stretch of the wrap material. For example, the applied wrap stretch factor may be expressed as a percentage increase in the length of the wrap material when compared to the unstretched length of the wrap material, e.g., an applied wrap stretch factor of twenty five percent (25%) would indicate that the as applied stretched length of the wrap material is twenty five percent longer than the un-stretched length of the wrap material. It should be appreciated that the applied wrap stretch factor may be expressed in some other manner, ratio, number, visual representation, etc.

In one aspect of the disclosure, the baler implement may include a communicator configured to communicate a message. The communicator may be located with the baler implement or remote from the baler implement. For example, the communicator may include, but is not limited to, a visual display located in the operator's station of an associated tractor linked to the baler implement. The processor may be operable to execute the wrap stretch algorithm to generate and transmit a communication signal to the communicator for communicating the applied wrap stretch factor. The communication signal may be configured to generate the applied wrap stretch factor as a visual representation and/or as text on the visual display.

In one aspect of the disclosure, the processor may be operable to execute the wrap stretch algorithm to determine if the applied wrap stretch factor is less than a minimum threshold or greater than a maximum threshold. The baler controller may then control a torque controlling device of the wrap system to increase tension in the wrap material during the wrap cycle when the applied wrap stretch factor is less than the minimum threshold. In contrast, the baler controller may control the torque controlling device of the wrap system to decrease tension in the wrap material during the wrap cycle when the applied wrap stretch factor is greater than the maximum threshold.

In one aspect of the disclosure, the wrap system includes a supply roll of the wrap material. In one implementation, the torque controlling device may include, but is not limited to, a brake coupled to the supply roll and configured to resist rotation of the supply roll during the wrap cycle. The brake may be controlled to apply a braking force to resist rotation of the supply roll during the wrap cycle. The brake force may be increased to increase tension in the wrap material during the wrap cycle and increase the wrap stretch. In contrast, the braking force may be decreased to decrease tension in the wrap material during the wrap cycle and reduce the wrap stretch.

In one implementation of the disclosure, the wrap sensor may include, but is not limited to, a position sensor coupled to the supply roll of the wrap material. The position sensor may be configured for sensing data related to a diameter of the supply roll of the wrap material. For example, the position sensor may be coupled to a linkage, bar, bracket or other structure supporting the supply roll of the wrap material and that moves with the supply roll of the wrap material as the amount of wrap material on the supply roll changes. Alternatively, the position sensor may be placed in direct contact with an exterior surface of the wrap material on the supply roll, such that a change in the amount of the wrap material on the supply roll changes a position of the position sensor.

In one aspect of the disclosure, the processor may be operable to execute the wrap stretch algorithm to correlate a change in the diameter of the supply roll during a wrap cycle to a length of the wrap material dispensed during the wrap cycle. In other words, as the wrap material is dispensed during the wrap cycle, the diameter of the supply roll of the wrap material also changes. The change in diameter of the supply roll during a wrap cycle is directly related to the amount of the wrap material dispensed during the wrap cycle. As such, the baler controller may determine and/or calculate the length of the wrap material dispensed during the wrap cycle based on the change in diameter of the supply roll of the wrap material during the wrap cycle. The baler controller may then define the length of the wrap material dispensed during the wrap cycle as the unstretched length of the wrap material dispensed by the wrap system during the wrap cycle.

In one implementation of the disclosure, the wrap sensor may include, but is not limited to, a rotational speed sensor configured for sensing data related to a rotational speed of the supply roll of the wrap material during the wrap cycle. The baler controller may calculate the unstretched length of the wrap material dispensed during the wrap cycle from the data related to the diameter of the supply roll of the wrap material and the data related to the rotational speed of the supply roll of the wrap material during the wrap cycle.

In one implementation, the wrap sensor may include a linear measuring device that is configured for measuring a length of the wrap material dispensed during the wrap cycle. For example, the linear measuring device may include a measuring wheel disposed in contact with an exterior circumferential surface of the supply roll of the wrap material.

In one aspect of the disclosure, the processor may be operable to execute the wrap stretch algorithm to receive a user input setting the number of wrap layers of the wrap material during the wrap cycle. For example, an operator may select 4 complete wraps around the circumference of the bale. The baler controller may then rotate the bale within the baling chamber to apply the desired number of wrap layers of the wrap material during the wrap cycle.

A method of controlling the wrap system of the baler implement is also provided. The method includes the baler controller determining the unstretched length of the wrap material dispensed by the wrap system during the wrap cycle from data sensed by the wrap sensor related to the unstretched length of the wrap material. The baler controller further determines a circumference of the bale in the baling chamber of the baler implement from data sensed by the bale size sensor related to the diameter of the bale. The baler controller may then determine a stretched length of the wrap material as applied onto the bale during the wrap cycle from the circumference of the bale in the baling chamber and the number of wrap layers of the wrap material around the bale. The stretched length of the wrap material as applied onto the bale may be compared by the baler controller to the unstretched length of the wrap material dispensed by the wrap system during the wrap cycle to determine the applied wrap stretch factor. The baler controller may then transmit a communication signal to a communicator. The communication signal is configured to generate an output from the communicator indicating the applied wrap stretch factor.

In one aspect of the method described herein, the baler controller may control a torque controlling device of the wrap system to increase tension in the wrap material during the wrap cycle when the applied wrap stretch factor is less than a minimum threshold. The baler controller may control the torque controlling device of the wrap system to decrease tension in the wrap material during the wrap cycle when the applied wrap stretch factor is greater than a maximum threshold.

In one aspect of the method described herein, the wrap sensor includes the position sensor coupled to the supply roll of the wrap material. The position sensor is configured for sensing data related to a diameter of the supply roll of the wrap material. The method may further include determining the unstretched length of the wrap material dispensed by the wrap system during a wrap cycle by correlating a change in the diameter of the supply roll during a wrap cycle to a length of the wrap material dispensed during the wrap cycle. The baler controller may then define the length of the wrap material dispensed during the wrap cycle as the unstretched length of the wrap material dispensed by the wrap system during the wrap cycle.

Accordingly, the baler implement and the process described herein provide real time on the go feedback to the operator of the applied wrap stretch factor of the wrap material, i.e., the wrap stretch. As such, the operator does not have to stop baling operations and exit the operator's station of the tractor to visually inspect the wrap material to determine the stretch factor. The operator may use the stretch factor to make changes to the wrap system, or in other implementations, the baler controller may automatically adjust the wrap system to achieve the desired stretch factor.

The above features and advantages and other features and advantages of the present teachings are readily apparent from the following detailed description of the best modes for carrying out the teachings when taken in connection with the accompanying drawings.

DETAILED DESCRIPTION

Figure 1:
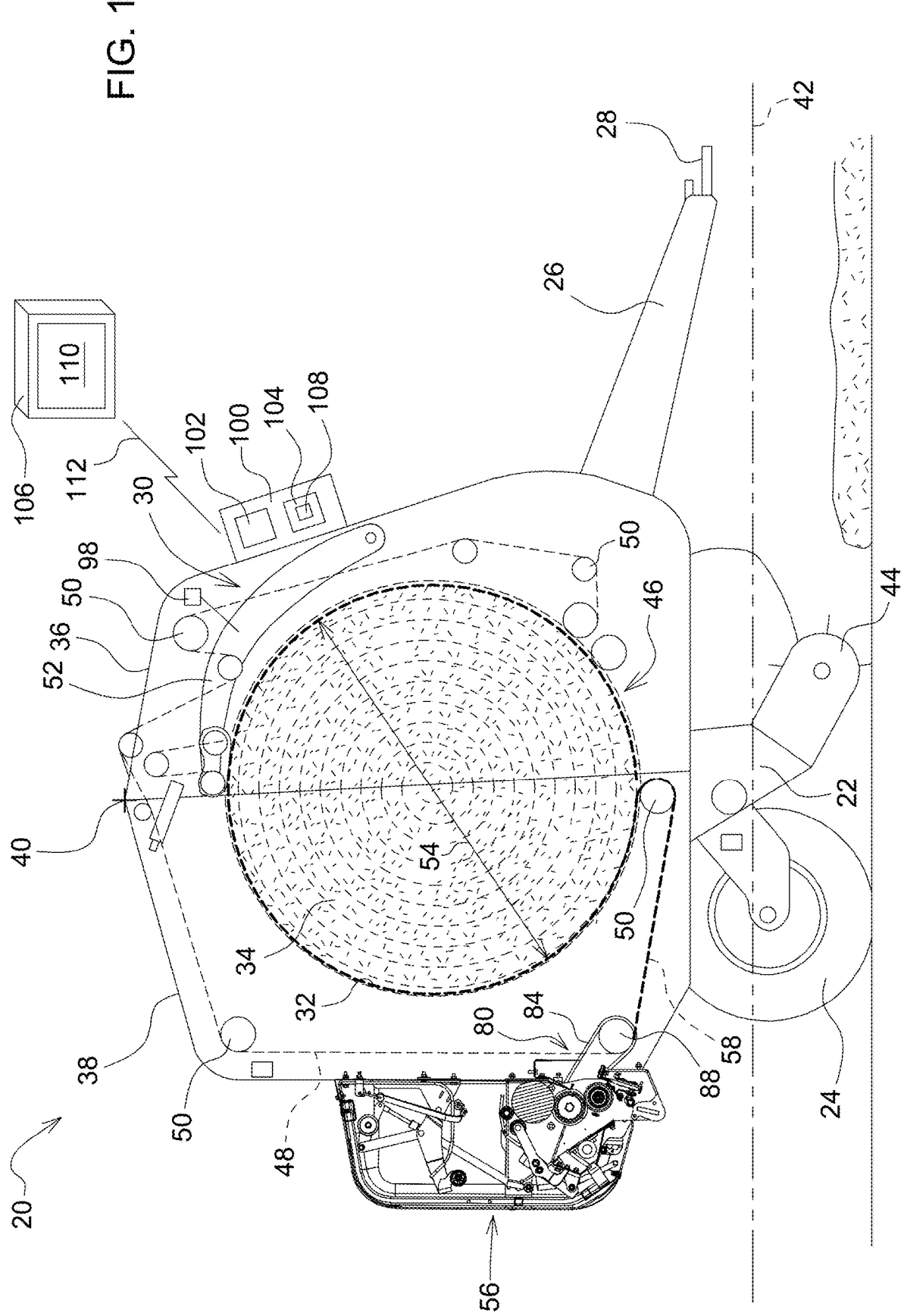
FIG. 1 is a schematic side view of a baler implement.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Referring to the Figures, wherein like numerals indicate like parts throughout the several views, an example implementation of a baler implement is generally shown at 20. The example implementation of the baler implement 20 is shown and described herein as a round baler. It should be appreciated that the features and operation of the baler implement 20 may differ from the example implementation shown in the Figures and described herein.

Referring to FIG. 1, the baler implement 20 includes a frame 22. One or more ground engaging elements 24, such as but not limited to one or more wheels and/or tracks, are attached to and rotatably supported by the frame 22. A tongue 26 may be coupled to the frame 22 at a forward end of the frame 22. A hitch arrangement 28 may be included with the tongue 26. The hitch arrangement 28 may be used to attach the baler implement 20 to a traction unit, such as but not limited to an agricultural tractor. In other embodiments, the baler implement 20 may be self-propelled, in which case the traction unit and the baler implement 20 are configured as a single, self-propelled vehicle.

The baler implement 20 includes a baling system 30 having a baling chamber 32 that is configured to form crop material into a bale 34. The baler implement 20 includes a housing 36 partially forming the baling chamber 32. The housing 36 is attached to and supported by the frame 22. The housing 36 may include one or more walls or panels that at least partially enclose and/or define the baling chamber 32.

The baler implement 20 further includes a gate 38. The gate 38 is attached to and rotatably supported by the housing 36. The gate 38 is positioned adjacent a rearward end of the frame 22 and is pivotably moveable about a gate axis 40. The gate axis 40 is generally horizontal and perpendicular to a central longitudinal axis 42 of the frame 22. The gate 38 is moveable between a closed position for forming the bale 34 within the baling chamber 32, and an open position for discharging the bale 34 from the baling chamber 32.

The baler implement 20 includes a pick-up 44 disposed proximate the forward end of the frame 22. The pickup gathers crop material from a ground surface and directs the gathered crop material toward and into an inlet 46 of the baling chamber 32. The pickup may include, but is not limited to tines, forks, augers, conveyors, baffles, etc., for gathering and moving the crop material.

The baler implement 20 may be configured as a variable chamber baler, or as a fixed chamber baler. As understood by those skilled in the art, the fixed chamber baler includes a plurality of transversely extending rollers 50 that are fixed in position relative to the frame 22 and the housing 36. The rollers 50 rotatably support the crop material therein and form the circumferential limits of the baling chamber 32. The baler implement 20 shown in the Figures and described herein is depicted and described as a variable chamber baler. As is understood by those skilled in the art, the variable chamber baler includes a plurality of longitudinally extending side-by-side forming belts 48 that are supported by a plurality of rollers 50. The bale 34 is formed by the forming belts 48 and one or more side walls of the housing 36. The forming belts 48 therefore form the circumferential surface of the baling chamber 32.

The crop material is directed through the inlet 46 and into the baling chamber 32, whereby the forming belts 48 roll the crop material in a spiral fashion into the bale 34 having a cylindrical shape. The forming belts 48 apply a constant pressure to the crop material as the crop material is formed into the bale 34. A belt tensioner 52 continuously moves the forming belts 48 radially outward relative to a center of the cylindrical bale 34 as a diameter 54 of the bale 34 increases. The belt tensioner 52 maintains the appropriate tension in the forming belts 48 to obtain the desired density of the crop material forming the bale 34.

Figure 2:
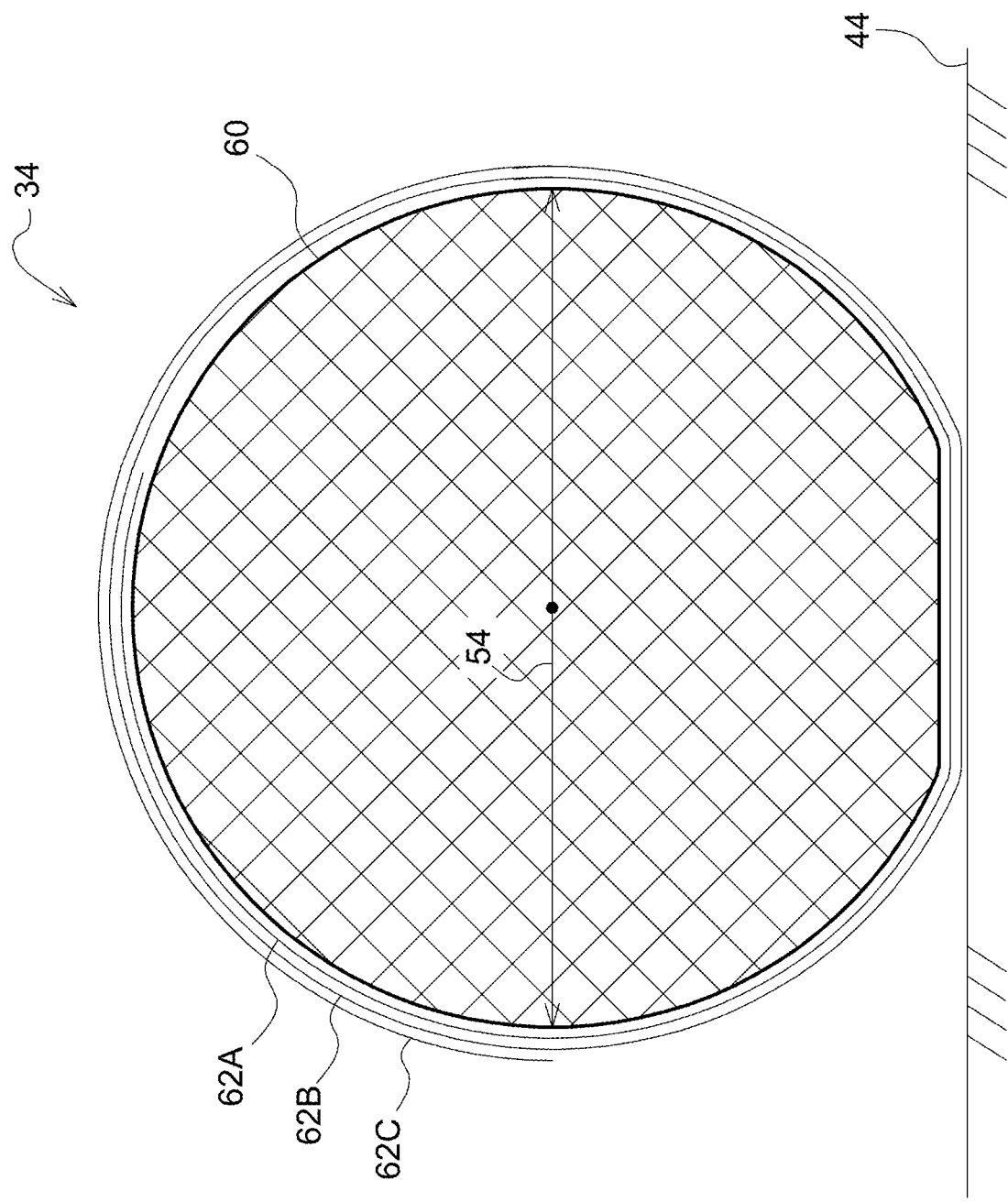
FIG. 2 is a schematic cross-sectional view of a bale showing a number of wrap layers of a wrap material on the bale.

The baler implement 20 includes a wrap system 56. The wrap system 56 is operable to wrap the formed bale 34 within the baling chamber 32 with a wrap material 58. The wrap system 56 is configured to wrap a circumference 60 of the bale 34 with a number of wrap layers 62A, 62B, 62CA, of the wrap material 58 during a wrap cycle. The wrap material 58 may include, but is not limited to, a net mesh wrap or a solid plastic wrap as is understood by those skilled in the art. Once the bale 34 is formed to a desired size within the baling chamber 32, the wrap system 56 is initiated to begin the wrap cycle. Upon initiation of the wrap cycle, the wrap system 56 feeds or inserts the wrap material 58 through an access 80 and into the baling chamber 32, whereby the wrap material 58 is wrapped around the exterior circumference 60 of the cylindrical shape of the bale 34 with the defined number of wrap layers 62A, 62B, 62C to secure the crop material in a tight package and maintain the desired generally cylindrical shape of the bale 34, at the desired density, such as shown in FIG. 2. In one implementation, the access 80 may include the inlet 46, through which the crop material moves into the baling chamber 32. In another implementation, the access 80 may include an opening into the baling chamber 32 that is separate from the inlet 46. When the wrap cycle is complete, the gate 38 is moved into the open position, which simultaneously moves the forming belts 48 clear of the formed bale 34, and allows the formed and wrapped bale 34 to be discharged through the rear of the baling chamber 32.

Figure 3:
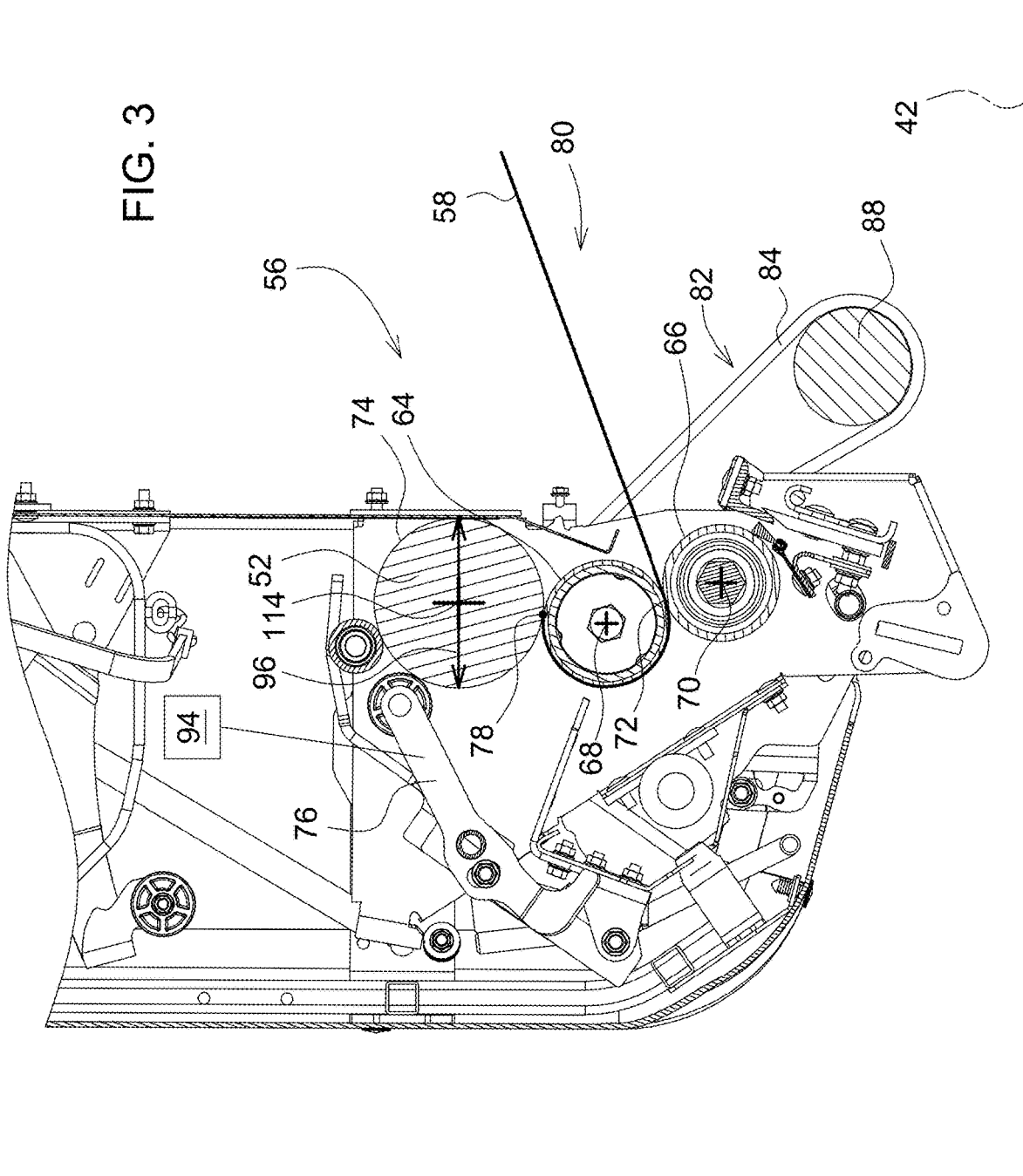
FIG. 3 is a schematic cross-sectional view of a wrap system of the baler implement, viewed from a first side of the baler implement.

Referring to FIGS. 3, an example implementation of the wrap system 56 is generally shown. It should be appreciated that the wrap system 56 may differ from the example implementation shown in the Figures and described herein. As shown, the wrap system 56 includes a pair of spool rollers 64, 66. The pair of spool rollers 64, 66 includes a first roller 64 and a second roller 66. The first roller 64 and the second roller 66 are arranged in a parallel relationship, and extend transversely across a width of the frame 22 in a horizontal orientation, generally perpendicular to the central longitudinal axis 42 of the frame 22. The first roller 64 includes a cylindrical shape having a respective centerline 68, about which the first roller 64 rotates. As such, the respective centerline 68 of the first roller 64 is an axis of rotation of the first roller 64. The second roller 66 includes a cylindrical shape having a respective centerline 70, about which the second roller 66 rotates. As such, the respective centerline 70 of the second roller 66 is an axis of rotation of the second roller 66. The first roller 64 and the second roller 66 are arranged such that a circumferential surface of the first roller 64 and a circumferential surface of the second roller 66 are disposed in contacting or abutting engagement, and form a nip 72 therebetween where their respective circumferential surfaces come together and meet. As used herein, the term "nip 72" may be defined as, but is not limited to, the region where the first roller 64 and the second roller 66 come together and contact each other.

As described above, the pair of spool rollers 64, 66 are configured to rotate about their respective axes of rotation. The first roller 64 and the second roller 66 rotate in opposite rotational directions relative to each other and receive the wrap material 58 from a supply roll 74 of the wrap material 58. The first roller 64 and the second roller 66 receive the wrap material 58 through the nip 72. As shown in the example implementation of the Figures, the first roller 64 is rotatable about its' respective axis of rotation in a counter-clockwise direction as viewed on the page of the drawing, and the second roller 66 is rotatable about its' respective axis of rotation in a clockwise direction as viewed on the page of the drawing. As such, the first roller 64 and the second roller 66 cooperate to feed the wrap material 58 through the nip 72, from left to right as viewed on the page of the drawing.

The first roller 64 includes an elastomer defining a cylindrical outer elastomer surface of the first roller 64. The elastomer exhibits static adhesion or "sticky" properties which limits movement of the wrap material 58 relative to the cylindrical outer elastomer surface of the first roller 64. The elastomer may include for example, but is not limited to, a natural or synthetic rubber material, or some other material having similar static adhesion properties.

The baler implement 20 further includes a support structure 76. The support structure 76 is configured to support the supply roll 74 of the wrap material 58 relative to the pair of spool rollers 64, 66. The support structure 76 supports the supply roll 74 such that the supply roll 74 of the wrap material 58 rests against the cylindrical outer elastomer surface of the first roller 64 along a contact region 78. Because the supply roll 74 of the wrap material 58 rests against the cylindrical outer elastomer surface of the first roller 64, it should be appreciated that the support structure 76 must allow the supply roll 74 of the wrap material 58 to move relative to the frame 22 of the baler implement 20 as the wrap material 58 is dispensed to maintain contact between the wrap material 58 on the supply roll 74 and the cylindrical outer elastomer surface of the first roller 64. The support structure 76 may include, but is not limited to, wall portions of the housing 36 of the baler implement 20, various guides, pins, grooves, brackets, etc. The specific construction of the support structure 76 in which the supply roll 74 of the wrap material 58 is supported is understood by those skilled in the art, is not pertinent to the teachings of this disclosure, and is therefore not described in greater detail herein.

As described above, the supply roll 74 of the wrap material 58 rests against the cylindrical outer elastomer surface of the first roller 64 along the contact region 78 and is continuously pressed against the cylindrical outer elastomer surface of the first roller 64 as a radial or diametric size of the supply roll 74 of the wrap material 58 decreases. The contact region 78 is the common contact surface area between the supply roll 74 of the wrap material 58 and the first roller 64. It should be appreciated that the contact region 78 extends generally parallel with a centerline 114 of the supply roll 74 and the centerline 68 of the first roller 64, across a width of the supply roll 74 of the wrap material 58.

The wrap material 58 follows a routing path that partially encircles the first roller 64, between the contact region 78 and the nip 72 and about the axis of rotation of the first roller 64. The routing path follows a counter-clockwise path around the cylindrical outer elastomer surface of the first roller 64 as viewed on the page of the drawing. The wrap material 58 enters the nip 72 moving from left to right as viewed on the page of the drawing, whereby the wrap material 58 is grasped between the first roller 64 and the second roller 66 at the nip 72. During a wrap cycle, the first roller 64 and the second roller 66 are counter rotated bout their respective axes of rotation to eject the wrap material 58 from the nip 72 toward and through the access 80 and into the baling chamber 32.

Figure 4:
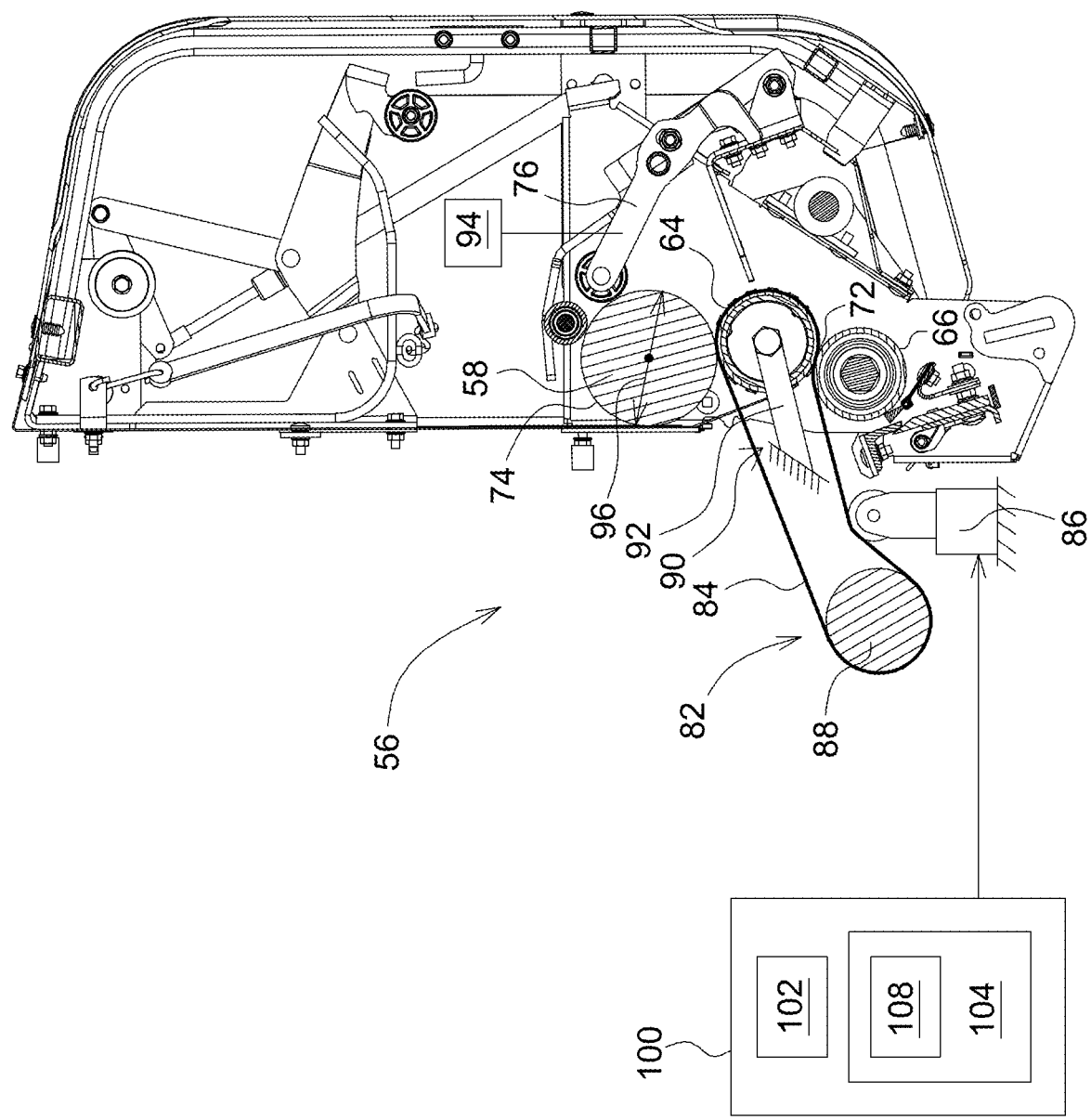
FIG. 4 is a schematic cross-sectional view of the wrap system, viewed from a second side of the baler implement.

Referring to FIG. 4, the wrap system 56 includes a driver 82 that is coupled to the pair of spool rollers 64, 66. The driver 82 is operable to transmit torque to the pair of spool rollers 64, 66 to rotate the pair of spool rollers 64, 66 about their respective axes of rotation. The driver 82 may be configured in any suitable manner, and include a device, system, or mechanism capable rotating the pair of spool rollers 64, 66 about their respective axes of rotation. In one implementation, the driver 82 includes a belt 84 coupled to at least one of the pair of spool rollers 64, 66 and a tensioner 86 operable to tension the belt 84. The belt 84 may be coupled to a rotating element 88, such as but not limited to a driven roller of the baling system 30, to receive torque therefrom. When the belt 84 is sufficiently tensioned by the tensioner 86, the belt 84 transmits torque from the rotating element 88 to the pair of spool rollers 64, 66, thereby rotating the pair of spool rollers 64, 66 about their respective axes of rotation. When tension in the belt 84 is reduced by the tensioner 86, the belt 84 slips relative to the rotating element 88 and/or at least one of the pair of spool rollers 64, 66, such that the pair of spool rollers 64, 66 do not rotate. Accordingly, it should be appreciated that the amount of torque applied to the pair of spool rollers 64, 66 is proportional to and/or controlled by the tension in the belt 84. It should be appreciated the torque transfer to the pair of spool rollers 64, 66 may be controlled via other systems and/or components of the baler implement 20, other than the example implementation described herein.

Referring to FIG. 4, the baler implement 20 may further include a torque controlling device 90 operable to control tension in the wrap material 58 during the wrap cycle. Once the wrap material 58 is introduced into the baling chamber 32 during a wrap cycle, the wrap material 58 is trapped between the bale 34 and the baling system 30, e.g., the forming belts 48. The bale 34 is rotated within the baling chamber 32, thereby rotating the wrap material 58 with the bale 34 and wrapping the wrap material 58 around the outer circumference 60 of the bale 34. In order to maintain the compression of the crop material forming the bale 34 after ejection from the baler implement 20, the wrap material 58 is tensioned as it is wrapped around the bale 34 within the baling chamber 32. Tensioning the wrap material 58 applies a compressive force to the bale 34, securing the shape and density of the bale 34 once ejected from the baling chamber 32.

In order to tension the wrap material 58 during the wrap cycle, the baler implement 20 may include the torque controlling device 90. The torque controlling device 90 may include a system that is configured to resist or pull against the wrap material 58 as the wrap material 58 is being drawn into the baling chamber 32 to wrap the bale 34, thereby generating tension in the wrap material 58. For example, the torque controlling device 90 may include, but is not limited to, a brake 92 that is coupled to the supply roll 74 and configured to resist rotation of the supply roll 74 during the wrap cycle. It should be appreciated that the brake 92 may be coupled to and/or incorporated into the driver 82. After initial insertion of the wrap material 58 into the baling chamber 32 during the wrap cycle, the brake 92 may be engaged to resist rotation of the supply roll 74 of the wrap material 58 and thereby introduce tension into the wrap material 58 during the wrap cycle. It should be appreciated that the torque controlling device 90 may be implemented using some other system couped to some other component of the wrap system 56, such as but not limited to the first roller 64 and/or the second roller 66. The features and operation of the torque controlling device 90, such as the brake 92 for example, are understood by those skilled in the art, are not pertinent to the teachings of this disclosure, and are therefore not described in greater detail herein.

Referring to FIG. 3, The baler implement 20 includes a wrap sensor 94 that is configured to detect data related to an unstretched length of the wrap material 58 dispensed by the wrap system 56 during the wrap cycle. As noted above, the wrap material 58 is tensioned during the wrap cycle. Tension in the wrap material 58 during the wrap cycle introduces a degree or an amount of stretch into the wrap material 58. The unstretched length of the wrap material 58 dispensed during the wrap cycle is the length that the wrap material 58 used to wrap the bale 34 would exhibit if the wrap material 58 were in an unstretched or non-tensioned condition.

The wrap sensor 94 may include a device that is capable of collecting data related to and/or that may be used to determine/calculate the unstretched length of the wrap material 58. For example, in one implementation, the wrap sensor 94 may include a position sensor that is coupled to the supply roll 74 of the wrap material 58, for example, the support structure 76 supporting the supply roll 74. The position sensor may be configured for sensing data related to a diameter 96 of the supply roll 74 of the wrap material 58. For example, the position sensor may be configured for sensing data related to a position of the supply roll 74 relative to the support structure 76, or relative to the first roller 64. As described above, an outer surface of the supply roll 74 of the wrap material 58 rides on the first roller 64. As the wrap material 58 is dispensed, the diameter 96 of the supply roll 74 decreases. As such, as the diameter 96 of the supply roll 74 changes, the position of a center of the supply roll 74 changes relative to the first roller 64. As the supply roll 74 is supported by the support structure 76, as the diameter 96 of the supply roll 74 changes, the position of the supply roll 74 may also change relative to the support structure 76. The position sensor may detect data related to the position of the supply roll 74, which may be correlated to a diameter 96 of the supply roll 74. The position sensor may include, but is not limited to, an axial or linear position sensor, a rotary position sensor, an optical sensor, etc.

The position sensor may be configured to detect a position of a component of the wrap system 56 that moves as the wrap material 58 is dispensed during the wrap cycle. By detecting the position of the component at the beginning of the wrap cycle and at the end of the wrap cycle, a change in position during the wrap cycle may be determined. This change in position during the wrap cycle may be correlated to a change in diameter 96 of the supply roll 74 of the wrap cycle, which may in turn be correlated to a length of the wrap material 58 dispensed during the wrap cycle. This length of the wrap material 58 dispensed during the wrap cycle may be defined as the unstretched length of the wrap material 58.

In another implementation, the wrap sensor 94 may include a rotational speed sensor configured for sensing data related to a rotational speed of the supply roll 74 of the wrap material 58 during the wrap cycle. The unstretched length of the wrap material 58 may be calculated from the rotational speed and a diameter 96 of the supply roll 74 of the wrap material 58. The diameter 96 of the supply roll 74 of the wrap material 58 may be determined for example, via the position sensor described above, or via some other sensor capable of detecting data related to the diameter 96 of the supply roll 74 of the wrap material 58 during the wrap cycle.

In another implementation, the wrap sensor 94 may include a linear measuring device configured for measuring a length of the wrap material 58 dispensed during the wrap cycle. For example, the linear measuring device may include a measuring wheel disposed in contact with the supply roll 74 of the wrap material 58. The linear measuring device may directly measure the length of the wrap material 58 dispensed from the supply roll 74.

Referring to FIG. 1, the baler implement 20 may further include a bale size sensor 98 that is configured to detect data related to a diameter 54 of the bale 34 within the baling chamber 32. The bale size sensor 98 may include a device that is capable of collecting data related to and/or that may be used to determine/calculate the diameter 54 of the bale 34. For example, the bale size sensor 98 may include, but is not limited to a position sensor, e.g., a rotary position sensor coupled to the belt tensioner 52 of the baling system 30. In other implementations, the bale size sensor 98 may include an optical sensor positioned to capture an image from which the diameter 54 of the bale 34 may be determined. It should be appreciated that the bale size sensor 98 may include some other type of sensor capable of detecting some other type of data from some other component of the baler implement 20 not specifically described herein, which may be used to calculate and/or determine the diameter 54 of the bale 34.

Referring to FIG. 1, the baler implement 20 may further include a baler controller 100. The baler controller 100 may be disposed in communication with the various components of the baler implement 20 for receiving and/or communicating information and/or instructions to achieve the operations described below. The baler controller 100 is operable to receive data signals from the various sensors and/or communicate control signals to the components of the baler implement 20. While the baler controller 100 is generally described herein as a singular device, it should be appreciated that the baler controller 100 may include multiple devices linked together to share and/or communicate information therebetween. Furthermore, it should be appreciated that the baler controller 100 may be located on the baler implement 20 or located remotely from the baler implement 20.

The baler controller 100 may alternatively be referred to as a computing device, a computer, a controller, a control unit, a control module, a module, etc. The baler controller 100 includes a processor 102, a memory 104, and all software, hardware, algorithms, connections, sensors, etc., necessary to manage and control the operation of the baler implement 20 as described herein. As such, a method may be embodied as a program or algorithm operable on the baler controller 100. It should be appreciated that the baler controller 100 may include any device capable of analyzing data from various sensors, comparing data, making decisions, and executing the required tasks.

As used herein, "controller" is intended to be used consistent with how the term is used by a person of skill in the art, and refers to a computing component with processing, memory, and communication capabilities, which is utilized to execute instructions (i.e., stored on the memory 104 or received via the communication capabilities) to control or communicate with one or more other components. In certain embodiments, the baler controller 100 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The baler controller 100 may be in communication with other components on the baler implement 20, such as hydraulic components, electrical components, and operator inputs within an operator station of an associated work vehicle. The baler controller 100 may be electrically connected to these other components wirelessly or via a wiring harness such that messages, commands, and electrical power may be transmitted between the baler controller 100 and the other components. Although the baler controller 100 is referenced in the singular, in alternative embodiments the configuration and functionality described herein can be split across multiple devices using techniques known to a person of ordinary skill in the art.

The baler controller 100 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 104 may include any non-transitory/tangible medium which participates in providing data or computer-readable instructions. The memory 104 may be non-volatile or volatile. Non-volatile media may include, for example, optical or magnetic disks and other persistent memory. Example volatile media may include dynamic random access memory (DRAM), which may constitute a main memory. Other examples of embodiments for memory 104 include a floppy, flexible disk or hard disk, magnetic tape or other magnetic medium, a CD-ROM, DVD, and/or any other optical medium, as well as other possible memory devices such as flash memory.

As noted above, with reference to FIG. 1, the baler controller 100 may be disposed in communication with a communicator 106. The communicator 106 may be located on the baler implement 20, or remotely from the baler implement 20, such as in an operator's station of an associated traction unit. The communicator 106 is configured for communicating a message to an operator of the baler implement 20. The communicator 106 may include, for example, a visual display, such as but not limited to a touch screen display of the operator's station, a speaker, an indicator light, etc. The baler controller 100 may generate and transmit a communication signal 112 to the communicator 106 operable to cause the communicator 106 to generate a message indicating an applied wrap stretch factor 110. The applied wrap stretch factor 110 may be represented in terms of a percentage of stretch of the wrap material 58 in an as-applied condition on the bale 34. In other implementations, the message indicating the applied wrap stretch factor 110 may visually represent the applied wrap stretch factor 110, either textually or symbolically. In yet other implementations, the communicator 106 may generate an audio signal indicating the applied wrap stretch factor 110.

As described above, the baler controller 100 includes the tangible, non-transitory memory 104 on which are recorded computer-executable instructions, including a wrap stretch algorithm 108. The processor 102 of the baler controller 100 is configured for executing the wrap stretch algorithm 108. The wrap stretch algorithm 108 implements a method of controlling the wrap system 56 of the baler implement 20, described in detail below.

The method of controlling the wrap system 56 may include the baler controller 100 receiving a user input setting and/or defining the number of wrap layers 62A, 62B, 62C of the wrap material 58 to be applied around the bale 34 during the wrap cycle. An operator may enter the user input via the communicator 106, or some other data input device, such as but not limited to a keypad, microphone, touchscreen, keyboard, etc. The desired number of wrap layers 62A, 62B, 62C may be selected and/or defined based on the crop type, type of wrap material 58, e.g., net material or solid material, a physical property of the wrap material 58, e.g., stretchability, an intended use of the bale 34, e.g., hay or silage, or some other factor not specifically noted herein. The number of wrap layers 62A, 62B, 62C of the wrap material 58 may be defined to include a partial or fractional number, e.g., three point seven wraps (3.7 wraps), or four and one quarter wraps (4.25 wraps), etc. For example, FIG. 2 shows three (3) wrap layers 62A, 62B, 62C, with layers 62A and 62B as complete wrap layers, and layer 62C as one quarter (¼) of a complete wrap layer. In other implementations, the baler controller 100 may automatically select the desired number of wrap layers 62A, 62B, 62C of the wrap material 58 to apply to the bale 34, based on pre-defined factors and/or settings.

Once the baler implement 20 has formed the bale 34 to the desired size in the bailing chamber, the baler controller 100 or the operator may initiate the wrap cycle. Upon initiation of the wrap cycle, the wrap system 56 is engaged to initiate the wrap material 58 into the baling chamber 32 as described above. As a leading edge of the wrap material 58 enters the baling chamber 32, the leading edge engages the crop forming the bale 34 in the baling chamber 32 and is drawn into the baling chamber 32, between the bale 34 and baling system 30. Friction between the wrap material 58, the crop forming the bale 34, and the components of the baling system 30 keep the wrap material 58 secured relative to the bale 34. Once the wrap material 58 is introduced into the baling chamber 32 and engaged with the bale 34, the baler controller 100 may then rotate the bale 34 within the baling chamber 32 the requisite number of revolutions to apply the number of wrap layers 62A, 62B, 62C of the wrap material 58 during the wrap cycle, around the exterior circumference 60 of the bale 34. As described above, as the bale 34 is rotated within the baling chamber 32 to wind the wrap material 58 around the bale 34, the torque controlling device 90 is engaged to apply tension to the wrap material 58, which in turn stretches the wrap material 58 as the wrap material 58 is applied onto the bale 34.

Upon the completion of the wrap cycle, at which time the bale 34 is wrapped with the number of wrap layers 62A, 62B, 62C and the wrap material 58 disposed around the bale 34 has been severed from the supply roll 74 of the wrap material 58, the baler controller 100 may then determine and/or calculate the unstretched length of the wrap material 58 that was dispensed by the wrap system 56 during the wrap cycle. The baler controller 100 may determine the unstretched length of the wrap material 58 from the data sensed by the wrap sensor 94 related to the unstretched length of the wrap material 58.

For example, as described above, the wrap sensor 94 may be configured to detect a position of a component of the wrap system 56 that moves as the wrap material 58 is dispensed during the wrap cycle. By detecting the position of the component at the beginning of the wrap cycle and at the end of the wrap cycle, a change in position during the wrap cycle may be determined. This change in position during the wrap cycle may be correlated to a change in diameter 96 of the supply roll 74 of the wrap cycle, which may in turn be correlated to a length of the wrap material 58 dispensed during the wrap cycle. This length of the wrap material 58 dispensed during the wrap cycle may be defined as the unstretched length of the wrap material 58 dispensed by the wrap system 56 during the wrap cycle.

In another implementation, the wrap sensor 94 may include a rotational speed sensor configured for sensing data related to a rotational speed of the supply roll 74 of the wrap material 58 during the wrap cycle. The unstretched length of the wrap material 58 may be calculated from the rotational speed and a diameter 96 of the supply roll 74 of the wrap material 58. The diameter 96 of the supply roll 74 of the wrap material 58 may be determined for example, via the position sensor described above, or via some other sensor capable of detecting data related to the diameter 96 of the supply roll 74 of the wrap material 58 during the wrap cycle. In yet another implementation, the upstretched length of the wrap material 58 may be directly measured using a linear measuring device, such as a measuring wheel disposed in contact with an exterior surface of the supply roll 74 of the wrap material 58. It should be appreciated that the unstretched length of the wrap material 58 may be determined and/or calculated in some other manner not described herein.

The baler controller 100 may further determine a length of the circumference 60 of the bale 34 in the baling chamber 32. The baler controller 100 may use the data sensed by the bale size sensor 98 related to the diameter 54 of the bale 34 to determine/calculate the diameter 54 of the bale 34. For example, the bale size sensor 98 may include, but is not limited to a position sensor, e.g., a rotary position sensor coupled to the belt tensioner 52 of the baling system 30. The bale size sensor 98 may detect a position of the belt tensioner 52 and communicate the position of the belt tensioner 52 to the baler controller 100. The baler controller 100 may use this data, i.e., the position of the belt tensioner 52 sensed by the bale size sensor 98, to determine the diameter 54 of the bale 34. It should be appreciated that the baler controller 100 may determine the diameter 54 of the bale 34 using some other form of data in some other manner not described herein. The diameter 54 of the bale 34 may then be used to determine the length of the circumference 60 of the bale 34.

The baler controller 100 may then determine a stretched length of the wrap material 58 as applied onto the bale 34 during the wrap cycle. The baler controller 100 may determine the stretched length of the wrap material 58 as applied onto the bale 34 from the length of the circumference 60 of the bale 34 in the baling chamber 32 and the number of wrap layers 62A, 62B, 62C of the wrap material 58 applied onto the bale 34. The baler controller 100 may determine the circumference 60 of the bale 34 from the diameter 54 of the bale 34 determined above. As noted above, the number of wrap layers 62A, 62B, 62C of the wrap material 58 is defined and/or selected by the operator, or automatically selected by the baler controller 100. It should be appreciated that the circumference 60 of the bale 34 multiplied by the number of wrap layers 62A, 62B, 62C of the wrap material 58 is equal to the stretched length of the wrap material 58 as applied onto the bale 34 during the wrap cycle.

Once the baler controller 100 has determined the unstretched length of the wrap material 58 dispensed during the wrap cycle, and the stretched length of the wrap material 58 as applied onto the bale 34 during the wrap cycle, the baler controller 100 may then compare the stretched length of the wrap material 58 as applied onto the bale 34 to the unstretched length of the wrap material 58 dispensed by the wrap system 56 during the wrap cycle to determine an applied wrap stretch factor 110. In one implementation, the applied wrap stretch factor 110 may be expressed as a ratio comparing the upstretched length of the wrap material 58 to the stretched length of the wrap material 58. In other implementations, the applied wrap stretch factor 110 may include and be expressed as a percentage of stretch of the wrap material 58, e.g., the percentage of the stretched length of the wrap material 58 relative to the unstretched length of the wrap material 58. It should be appreciated that the applied wrap stretch factor 110 may be calculated and expressed in some other manner not described herein.

The baler controller 100 may then generate and transmit the communication signal 112 to the communicator 106 for communicating the applied wrap stretch factor 110. As described above, the communication signal 112 is configured and operable to generate an output from/on the communicator 106 indicating the applied wrap stretch factor 110. For example, the communication signal 112 may cause the communicator 106 to display the applied wrap stretch factor 110 as text on a visual display, graphically as a symbol on the visual display, graphically via a sliding scale on the visual display, audibly via a speaker, etc. It should be appreciated that the communicator 106 and the communication signal 112 thereto may cause the communicator 106 to generate the message in some other way capable of communicating the applied wrap stretch factor 110 to the operator not described herein.

The baler controller 100 may further compare the applied wrap stretch factor 110 to a minimum threshold and/or a maximum threshold. The minimum threshold may define a lower acceptable or desirable limit of the amount of stretch and/or tension in the wrap material 58 as applied onto the bale 34, whereas the maximum threshold may define an upper acceptable or desirable limit of the amount of stretch and/or tension in the wrap material 58 as applied onto the bale 34. The baler controller 100 may compare the applied wrap stretch factor 110 to the minimum threshold and/or the maximum threshold to determine if the applied wrap stretch factor 110 is less than the minimum threshold, or greater than the maximum threshold.

If the baler controller 100 determines that the applied wrap stretch factor 110 is less than the minimum threshold, then the stretch of the wrap material 58 and the associated tension thereof may be insufficient to maintain the desired shape and density of the bale 34. As such, if the baler controller 100 determines that the applied wrap stretch factor 110 is less than the minimum threshold, the baler controller 100 may control or adjust the torque controlling device 90 of the wrap system 56 to increase tension in the wrap material 58 during the wrap cycle, and thereby increase the amount of stretch in the wrap material 58 as applied onto the bale 34 during the wrap cycle. In contrast, if the baler controller 100 determines that the applied wrap stretch factor 110 is greater than the maximum threshold, then the baler controller 100 may control or adjust the torque controlling device 90 of the wrap system 56 to decrease tension in the wrap material 58 during the wrap cycle, and thereby reduce the amount of stretch in the wrap material 58 as applied onto the bale 34 during the wrap cycle.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A baler implement comprising:
   a baling system having a baling chamber configured to form crop material into a bale having a cylindrical shape;
   a wrap system configured to feed a wrap material into the baling chamber to wrap a circumference of the bale with a number of wrap layers of the wrap material during a wrap cycle;
   a wrap sensor configured to detect data related to an unstretched length of the wrap material dispensed by the wrap system during the wrap cycle;
   a bale size sensor configured to detect data related to a diameter of the bale within the baling chamber;
   a baler controller including a processor and a memory having a wrap stretch algorithm stored thereon, wherein the processor is operable to execute the wrap stretch algorithm to:
   determine the unstretched length of the wrap material dispensed by the wrap system during the wrap cycle from the data sensed by the wrap sensor related to the unstretched length of the wrap material;
   determine a circumference of the bale in the baling chamber from the data sensed by the bale size sensor related to the diameter of the bale;
   determine a stretched length of the wrap material as applied onto the bale during the wrap cycle from the circumference of the bale in the baling chamber and the number of wrap layers of the wrap material; and
   compare the stretched length of the wrap material as applied onto the bale to the unstretched length of the wrap material dispensed by the wrap system during the wrap cycle to determine an applied wrap stretch factor.

2. The baler implement set forth in claim 1, further comprising a communicator configured to communicate a message, wherein the processor is operable to execute the wrap stretch algorithm to generate and transmit a communication signal to the communicator for communicating the applied wrap stretch factor.

3. The baler implement set forth in claim 1, wherein the processor is operable to execute the wrap stretch algorithm to determine if the applied wrap stretch factor is less than a minimum threshold or greater than a maximum threshold.

4. The baler implement set forth in claim 3 wherein the processor is operable to control a torque controlling device of the wrap system to increase tension in the wrap material during the wrap cycle when the applied wrap stretch factor is less than the minimum threshold, and wherein the processor is operable to control the torque controlling device of the wrap system to decrease tension in the wrap material during the wrap cycle when the applied wrap stretch factor is greater than the maximum threshold.

5. The baler implement set forth in claim 4, wherein the wrap system includes a supply roll of the wrap material, and wherein the torque controlling device includes a brake coupled to the supply roll and configured to resist rotation of the supply roll during the wrap cycle.

6. The baler implement set forth in claim 1, wherein the wrap system includes a supply roll of the wrap material.

7. The baler implement set forth in claim 6, wherein the wrap sensor includes a position sensor coupled to the supply roll of the wrap material, wherein the position sensor is configured for sensing data related to a diameter of the supply roll of the wrap material.

8. The baler implement set forth in claim 7, wherein the processor is operable to execute the wrap stretch algorithm to correlate a change in the diameter of the supply roll during a wrap cycle to a length of the wrap material dispensed during the wrap cycle.

9. The baler implement set forth in claim 8, wherein the processor is operable to execute the wrap stretch algorithm to define the length of the wrap material dispensed during the wrap cycle as the unstretched length of the wrap material dispensed by the wrap system during the wrap cycle.

10. The baler implement set forth in claim 7, wherein the wrap sensor includes a rotational speed sensor configured for sensing data related to a rotational speed of the supply roll of the wrap material during the wrap cycle.

11. The baler implement set forth in claim 10, wherein the processor is operable to execute the wrap stretch algorithm to calculate the unstretched length of the wrap material dispensed during the wrap cycle from the data related to the diameter of the supply roll of the wrap material and the data related to the rotational speed of the supply roll of the wrap material during the wrap cycle.

12. The baler implement set forth in claim 1, wherein the processor is operable to execute the wrap stretch algorithm to receive a user input setting the number of wrap layers of the wrap material during the wrap cycle.

13. The baler implement set forth in claim 10, wherein the processor is operable to rotate the bale within the baling chamber to apply the number of wrap layers of the wrap material during the wrap cycle.

14. The baler implement set forth in claim 1, wherein the applied wrap stretch factor includes a percentage of stretch of the wrap material.

15. The baler implement set forth in claim 1, wherein the wrap sensor includes a linear measuring device configured for measuring a length of the wrap material dispensed during the wrap cycle.

16. The baler implement set forth in claim 13, wherein the linear measuring device includes a measuring wheel disposed in contact with a supply roll of the wrap material.

\* \* \* \* \*